United States Patent [19]

Braun et al.

[11] Patent Number: 4,811,709
[45] Date of Patent: Mar. 14, 1989

[54] FUEL INJECTION PUMP

[75] Inventors: Wolfgang Braun, Ditzingen; Wulf Emsmann, Gerlingen; Karl Konrath, Freiberg; Klaus Krieger, Affalterbach; Heinz Nothdurft, Stuttgart, all of Fed. Rep. of Germany

[73] Assignee: Robert Bosch GmbH, Stuttgart, Fed. Rep. of Germany

[21] Appl. No.: 148,588

[22] Filed: Jan. 26, 1988

[30] Foreign Application Priority Data

Feb. 3, 1987 [DE] Fed. Rep. of Germany ....... 3703073

[51] Int. Cl.[4] .............................................. F02M 39/00
[52] U.S. Cl. .................................. 123/357; 123/41.31; 165/41
[58] Field of Search ............. 123/357, 358, 359, 41.31, 123/509, 463, 494; 165/41, 80

[56] References Cited

U.S. PATENT DOCUMENTS

| 3,965,971 | 6/1976 | Rogoenkamp | 165/41 |
|---|---|---|---|
| 4,084,564 | 4/1978 | Rickert | 123/41.31 |
| 4,364,355 | 12/1982 | Karino | 123/41.31 |
| 4,532,893 | 8/1985 | Day | 123/509 |
| 4,685,433 | 8/1987 | Djordjevic | 123/357 |
| 4,732,546 | 3/1988 | Fehlmann | 123/357 |

FOREIGN PATENT DOCUMENTS 3243349 5/1984 Fed. Rep. of Germany ...... 123/357

OTHER PUBLICATIONS

SAE Technical Paper Series-The Second Generation of Electronic Diesel Fuel Injection Systems-Investigation with a Rotary Pump by Yamada et al.

Primary Examiner—Carl Stuart Miller
Attorney, Agent, or Firm—Felfe & Lynch

[57] ABSTRACT

A fuel injection pump, for use with a supercharged internal combustion engine, is provided with a full-load stop that is adjustable by means of a stepper motor in dependence upon operating parameters such as engine speed and manifold pressure. An electrical control device for the stepper motor is housed in a casing which is flange-mounted on the fuel injection pump and cooled by fuel. Electrical transducers for engine speed and manifold pressure are also mounted on the fuel injection pump.

4 Claims, 3 Drawing Sheets

FUEL INJECTION PUMP

BACKGROUND OF THE INVENTION

The present invention is based on a fuel injection pump of the type known from SAE Paper No. 860145. In such a fuel injection pump, there is provided a solenoid valve for fuel-quantity regulation which meters the quantity of fuel to be injected on the following delivery stroke during the suction stroke of the fuel injection pump plunger. This prior art fuel injection pump comprises a control device that is accommodated, at least in part, in a housing secured to the fuel injection pump. This housing comprises a cooling chamber which is located in the fuel feed line to the fuel injection pump and through which the fuel flows. The cooling chamber cools both the circuit section and the power section of the control device for actuation of the quick-acting solenoid valve. In this prior art injection pump, a solenoid operated metering valve thus is all that is actuated by the control device, the fuel quantity being regulated solely by means of this metering valve. This prior art fuel injection pump is not intended for the operation of supercharged internal combustion engines.

From published German published patent application (OS) No. 32 43 349 there is further known a fuel injection pump which is provided with a mechanical governor for regulation of the injected fuel quantity and which comprises a full-load stop that limits the maximum injected fuel quantity position of the governor. The full-load stop is movable by means of a stepper motor which is mounted on the pump housing and which shifts an intermediate lever that is rotatable about a pin fixed to the housing. The intermediate lever is able to move between a zero stop and the shaft of the stepper motor. Both linear and rotary stepper motors are proposed for use. However, with this prior art arrangement the control device for energization of the stepper motor is located remotely from the fuel injection pump and connected to the stepper motor through electrical leads. This has the drawback that a separate cooling system must be provided for cooling of this control device, and that upon installation of the fuel injection pump, provision must be made for the separate mounting of the control device.

SUMMARY OF THE INVENTION

An object of the present invention is to provide a fuel injection pump of the type described above which is suitable for use with a supercharged internal combustion engine and which forms a compact unit with the control device.

This object, as well as other objects which will become apparent from the discussion that follows, are achieved, according to the present invention, by providing a stepper motor, under control of the control device, for adjusting a full-load stop of a mechanical governor of the fuel injection pump by means of an intermediate lever, and by providing a manifold pressure sensor located adjacent to and cooled with the control device, for providing a manifold pressure signal to the control device.

Advantageously, the control device is cooled directly by the fuel flowing to the fuel injection pump. All that is required for installation of the fuel injection pump according to the invention is a power supply. All other parameters for regulation of the maximum injected fuel quantity of the fuel injection pump, on the basis of manifold pressure and engine speed, can be picked up at the pump itself by means of the sensors there provided.

For a full understanding of the present invention, reference should now be made to the following detailed description of the preferred embodiments of the invention and to the accompanying drawings.

DESCRIPTION OF THE PREFERRED EMBODIMENTS

Figure 1:
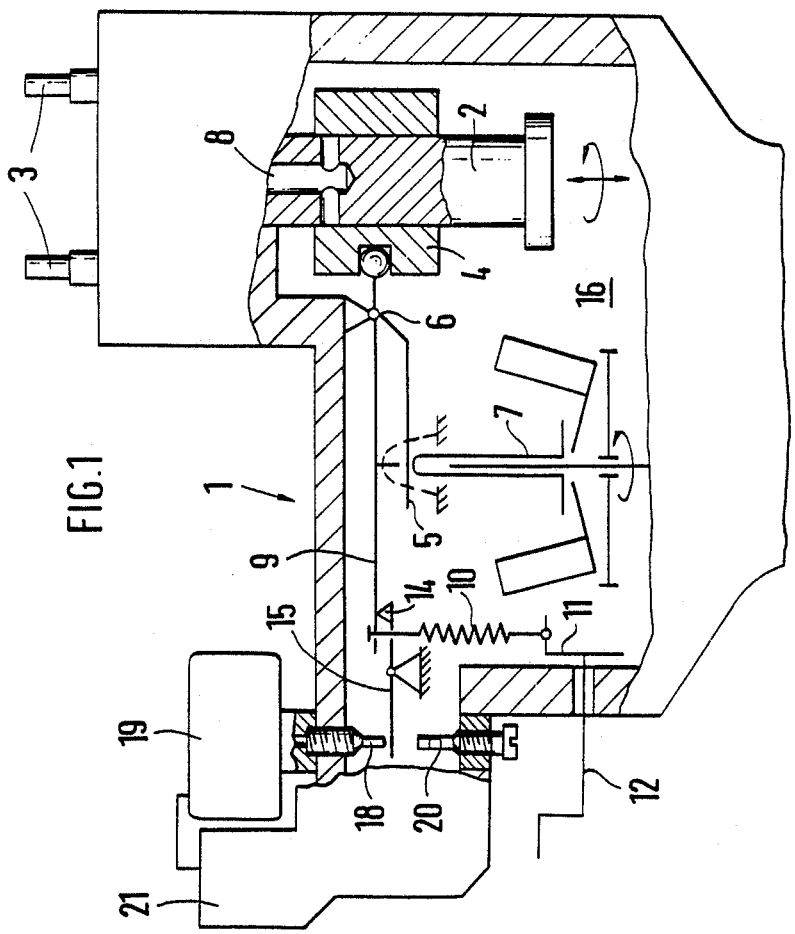
FIG. 1 is a general diagrammatic, sectional view of a fuel injection pump.

Shown in FIG. 1 is a fuel injection pump 1 of the distributor type. Such a fuel injection pump comprises, for example, a reciprocating and at the same time rotating plunger 2 which during its rotation brings a distributor port (not shown) into registration with various fuel outlet ports 3 on a delivery stroke of the pump plunger to supply fuel to respective injection points of the associated internal combustion engine. The injected fuel quantity is regulated conventionally by means of a cylindrical slide valve 4 that serves as a quantity adjusting member and whose upper edge controls a discharge channel 8 of the pump working space (not shown). By causing this channel to communicate with a fuel filled suction chamber 16, into which the pump plunger with the cylindrical slide valve 4 dips, the injection of fuel is interrupted in a well known manner during the high pressure delivery stroke of the pump plunger thus determining the effective pump plunger delivery stroke or injected fuel quantity.

The cylindrical slide valve 4 is coupled to a two-armed control lever 5 which at one end is pivoted on a pin 6 that is fixed to the housing and is optionally adjustable, and which at the other end is acted upon by a rotational speed sensor 7, shown in simplified form in FIG. 1. Sensor 7 may be a centrifugal sensor that is driven in synchronism with the rotational speed of the pump and acts upon the control lever 5 with a force that is a function of the rotational speed. The control lever 5 can be caused by the rotational speed sensor 7 to bear against a drag lever 9 which is also pivoted as a one-armed lever on the same pin 6 as the control lever. Coupled to the end of this drag lever 9 is a governor spring 10 whose initial tension can be varied in a well known manner by an eccentric 11. This eccentric can be actuated by means of an adjusting lever 12 that is adjustable at will from the exterior of the fuel injection pump.

The pivoting range of the drag lever 9, counter to the force of the governor spring 10, can be limited by means of an adjustable stop 14. The latter is located at the end of one arm of a two-armed intermediate lever 15 which is pivoted on a pin fixed to the housing. The end of the other arm of the intermediate lever 15 is acted upon by a positioning device 18, in the form of a linear shaft of a stepper motor 19, so as to pivot the intermediate lever 15 and thus adjust the position of the stop 14. The range of displacement of the positioning device 18 can be limited by means of an adjustable stop 20 formed, for example, by a screw inserted through the wall of the housing of the fuel injection pump. The stepper motor 19 is controlled by a control device 21 which transmits specific positioning steps to the stepper motor in dependence upon a control value based on operating parameters. To ensure that the intermediate lever 15 is accurately positioned, it is advantageously moved by the positioning device 18 all the way to the stop 20 into a zero position once during every start of the internal combustion engine. From the stop 20, the intermediate lever 15 is then moved a number of steps into the desired position (minimum intake manifold pressure full load) as determined by the control value of the positioning device. All further positioning then occurs from that position. The use of the intermediate lever 15 thus makes it possible to reduce the adjusting forces required of the stepper motor 19 for moving the stop 14 counter to the force of the governor spring 10. The stepper motor used is preferably a linear stepper motor.

Figure 2:
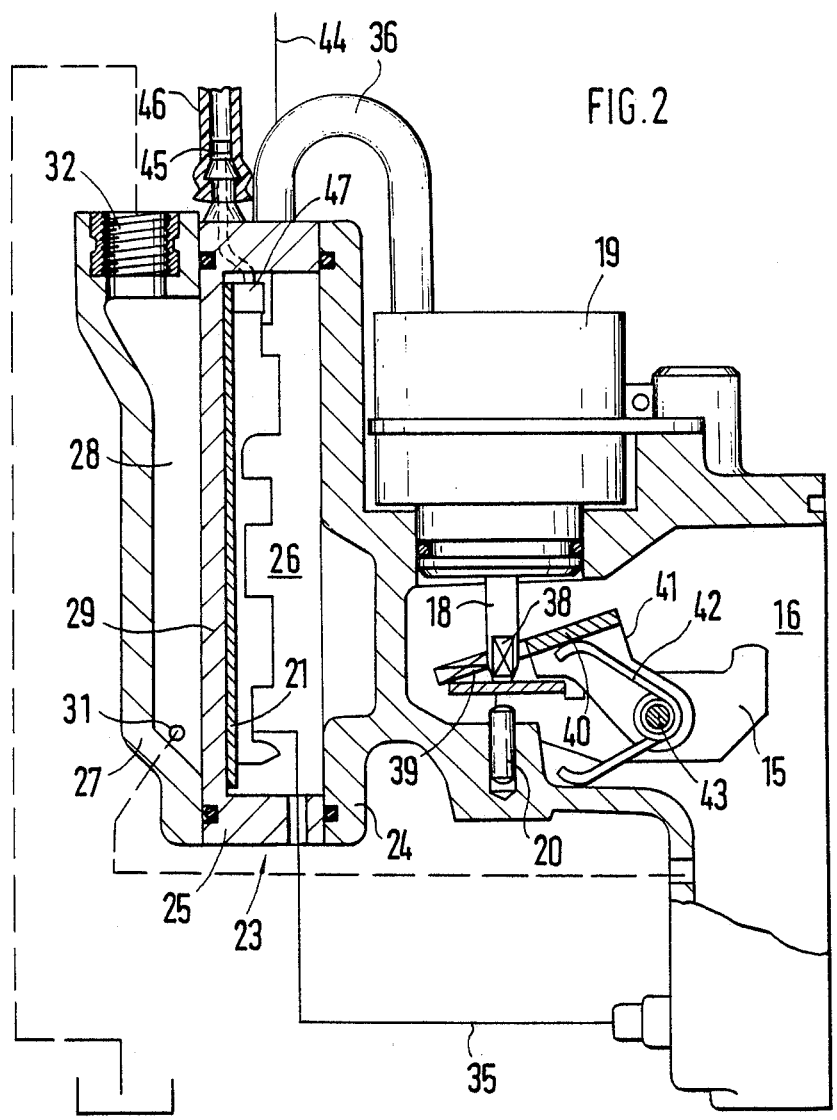
FIG. 2 shows a fragmentary section through the fuel injection pump of FIG. 1 in the area of the casing which houses the control device.
Figure 3:
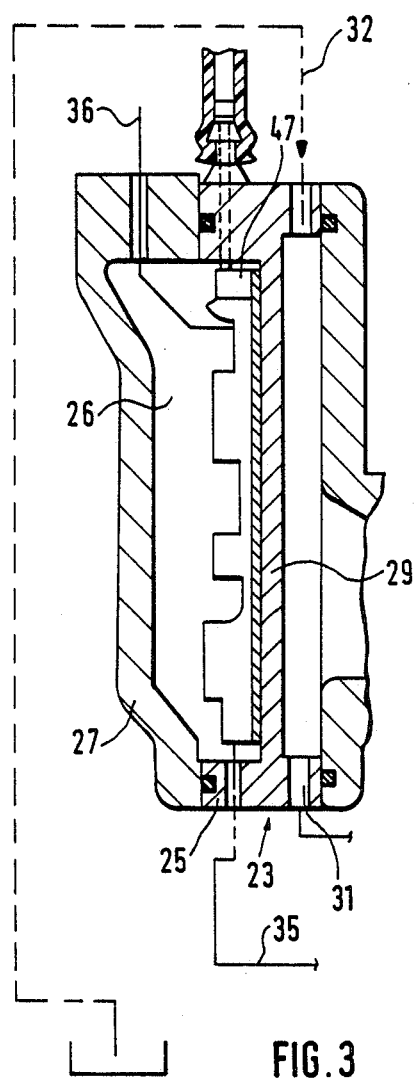

FIG. 2 shows in detail how the control device 21 is accommodated. It is housed in a casing 23 that is flange-mounted on an appropriately flanged portion 24 of the pump housing. The casing consists of a first, pan-shaped section 25 which, directed with its open side toward the flanged portion 24, encloses a circuit space 26 that accommodates the control device 21, and of a cover section 27 that is tightly attached to the outer bottom of the pan-shaped section 25 and, together with the bottom, encloses a cooling chamber 28. The bottom of the pan-shaped section 25 thus forms a heat-transfer wall 29 through which heat generated in the control device 21 can be dissipated toward the cooling chamber 28. The control device 21 comprises, in addition to the circuit board as such, a power output stage for operation of the stepper motor. The heat produced in this output stage is advantageously removed in the direction of the cooling chamber 28. The latter is provided with a fuel inlet 31 through which the fuel enters as a coolant, and with an outlet 32 through which it exits.

The cooling chamber 28 is located to advantage in the fuel feed line between the fuel tank and the suction chamber 16 in the interior of the fuel injection pump. To improve the thermal isolation of the control device from the suction chamber 16, which is a source of heat, the cooling chamber 28 may also be advantageously disposed on the side of the suction chamber, with the circuit space 26, closed by a cover, arranged on the outside. This version advantageously also facilitates access to the control device without interfering with the fuel circulation.

The control device 21 is connected through a signal lead 35 to an electric rotational-speed sensor (not specifically shown) located in the fuel injection pump which may be in the form of a segment rate sensor, for example. The output of the control device 21 is connected to the stepper motor 29 through a control line 36.

In addition, the control device 21 comprises a manifold pressure sensor 47 in the circuit space 26 which is connected through a hose coupling fitting 45 and a hose 46 with the supercharger or intake manifold on the internal combustion engine. The hose 46 can readily be installed and does not detract from the advantages offered by a compact, distributor type fuel injection pump with the integral control device.

To guard against twisting, the stepper motor comprises at the end of its linear shaft 18 which projects into the suction chamber 3 a flat portion 38 with which it penetrates a mating slot 39 in the arm of a one-armed bell crank 41. The bell crank 41, which thus prevents the linear shaft of the stepper motor 19 from twisting, is mounted on the same shaft 43 as the intermediate lever 15. Moreover, the bell crank is spring-loaded by a spring 42, one end of which is supported on the housing while the other end bears on the bell crank 41 so as to move it away from the stop 20. The bell crank thus comes to abut on the end of the flat portion 38 and prevents it from slipping out of the linear shaft 18.

The inventive design results in a compact combination of fuel injection pump, control device and stepper motor, so that all that is required in order to place the control device in operation is an electrical lead 44 from a power supply. This facilitates installation considerably since, as is conventional, only the fuel injection pump needs to be installed. The control device is optimally cooled by the fuel fed in from the fuel tank.

There has thus been shown and described a novel fuel injection pump which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention which is limited only by the claims which follow.

What is claimed is:

1. A fuel injection pump for an internal combustion engine having an intake manifold, said pump comprising, in combination:
   (a) a fuel pump housing;
   (b) a fuel pump, arranged in said housing, for supplying an injectable quantity of fuel at an injectable pressure to a plurality of passive fuel injectors, said fuel pump having means for adjusting said injectable fuel quantity;
   (c) a casing mounted on said fuel pump housing including:
      (1) a cooling chamber, having an inlet and outlet to facilitate the flow of fuel therethrough; and
      (2) a control chamber, separated from said cooling chamber by a heat transfer wall;
   (d) a vacuum line connected between said intake manifold and said control chamber;
   (e) a pressure sensor disposed in said control chamber and connected to said vacuum line, for producing a first signal representative of the manifold pressure of the internal combustion engine;
   (f) an engine speed sensor for producing a second signal representative of engine speed;
   (g) electrical control means located in said control chamber in heat conductive relationship with said heat transfer wall, for producing an electrical control signal in dependence upon said first and second signals;
   (h) a mechanical governor, having a full-load stop and an intermediate lever for controlling said fuel quantity adjusting means; and
   (i) a stepper motor for adjusting said intermediate lever in response to said control signal.

2. The fuel injection pump defined in claim 1, wherein said stepper motor comprises, as a positioning means, a linear shaft having a flat portion at its end that mates with a guide slot in a bell crank that is pivoted coaxially with said intermediate lever and is subject to the action of a return spring, and which limits the pivoting range of said intermediate lever from a stop fixed to said housing.

3. The fuel injection pump defined in claim 2, wherein said return spring maintains said bell crank in abutment against the end of said guide slot which serves as an antitwisting means for said linear shaft.

4. The fuel injection pump defined in claim 1, wherein said cooling chamber of said casing is located between the wall of the fuel injection pump which carries said casing and said control chamber of the casing that houses said control means.

* * * * *